United States Patent [19]

Nishiguchi

[11] Patent Number: 4,974,177

[45] Date of Patent: Nov. 27, 1990

[54] MAPPING CIRCUIT OF A CRT DISPLAY DEVICE

[75] Inventor: Takaya Nishiguchi, Kusatsu, Japan

[73] Assignee: Daikin Industries Ltd., Osaka, Japan

[21] Appl. No.: 366,322

[22] Filed: Jun. 14, 1989

Related U.S. Application Data

[63] Continuation of Ser. No. 914,999, Oct. 3, 1986, abandoned.

[30] Foreign Application Priority Data

Oct. 4, 1985 [JP] Japan .................................. 60-222546
Oct. 4, 1985 [JP] Japan .................................. 60-222547

[51] Int. Cl.$^5$ .............................................. G06F 15/72
[52] U.S. Cl. .................................................. 364/522
[58] Field of Search ...................... 364/518, 521, 522; 340/728, 747; 434/43

[56] References Cited

U.S. PATENT DOCUMENTS

| | | | |
|---|---|---|---|
| 4,181,953 | 1/1980 | Osofsky .................................. | 364/522 |
| 4,645,459 | 2/1987 | Graf et al. .............................. | 434/43 |
| 4,697,178 | 9/1987 | Heckel .................................. | 364/521 X |
| 4,725,831 | 2/1988 | Coleman .............................. | 340/747 |

Primary Examiner—Dale M. Shaw
Assistant Examiner—Mark K. Zimmerman
Attorney, Agent, or Firm—Staas & Halsey

[57] ABSTRACT

In a mapping circuit of a CRT display device in accordance with the present invention, vertex calculating means (2 and 3) evaluates corresponding relations between vertexes of a three-dimensional polygon and vertexes of a two-dimensional polygon and inclination calculating means (4 and 5) calculates inclination of the line segments connecting the respective vertexes of the three-dimensional polygon and inclinations of the line segments connecting the vertexes of the two-dimensional polygon. Vertexes interpolating means (6 and 7) performs interpolation between the respective vertexes of the three-dimensional polygon and also performs interpolation between the respective vertexes of the two-dimensional polygon. Then, using the interpolated points as start points or end points, start and end points interpolating means (9, 10, 11 and 12) performs interpolation between the respective start points and end points. A picture pattern on the coordinates of each interpolated point is read out by a pixel array memory control portion (14) and using the coordinates of each interpolated point as an address, the picture pattern is written in a frame memory (17), so that the picture pattern is displayed on a CRT display (18). Consequently, a host computer does not need to perform coordinate transformation in pixel units.

9 Claims, 8 Drawing Sheets

MAPPING CIRCUIT OF A CRT DISPLAY DEVICE

This is a continuation of co-pending application Ser. No. 914,999 filed on Oct. 3, 1986, now abandoned.

BACKGROUND OF THE INVENTION

1. Field of the Invention

The present invention relates to a mapping circuit of a CRT display device. More particularly, the present invention relates to a mapping circuit adapted to perform so-called texture mapping, namely, to map an arbitrary picture pattern onto planes representing a three-dimensional graphic on a CRT display device.

2. Description of the Related Art

In order to draw an arbitrary picture pattern, for example, oblique lines on each plane of a three-dimensional graphic represented on a CRT display device such as one used for computer-aided drafting (CAD), a technique called texture mapping is used. If texture mapping is applied, it is necessary to transform the picture pattern into coordinates on the planes representing the three-dimensional graphic on the CRT display in pixel units.

In case of applying texture mapping in a conventional CRT display device, coordinate transformation is made in pixel units by software processing in a host computer. However, if coordinate transformation is made in pixel units, it is necessary to make coordinate transformation for each of the pixels representing the three-dimensional graphic and accordingly the processing time becomes long, causing an increase in the workload of the host computer.

SUMMARY OF THE INVENTION

Therefore, a principal object of the present invention is to provide a mapping circuit of a CRT display device, formed by hardware to perform texture mapping by a terminal device, whereby the workload of a host computer can be decreased and the processing speed can be made fast.

Briefly stated, the present invention operates in the following manner. A terminal device evaluates corresponding relations between the vertexes of a polygon of a three-dimensional graphic and the vertexes of a two-dimensional polygon, and it also evaluates the inclinations of the line segments connecting the respective vertexes of the polygon of the three-dimensional graphic and the inclinations of the line segments connecting the respective vertexes of the two-dimensional polygon. Interpolations are applied between the respective vertexes of the polygon of the three-dimensional graphic and between the respective vertexes of the two-dimensional polygon. The points obtained by the interpolations are regarded as start points or end points and interpolations are applied between the respective associated start points and end points. Then, a picture pattern at the coordinates of the respective interpolated points is read out and using the coordinates of the interpolated points as addresses, the picture pattern is written in a frame memory, so that the written picture data is represented on the CRT display.

Consequently, according to a first aspect of the present invention, the host computer does not need to make coordinate transformation in pixel units as is different from a conventional device and a mapping circuit can be easily provided in a terminal device, which makes it possible to shorten the processing time.

In a second aspect of the invention, coordinates of the respective vertexes of a polygon represented in a three-dimensional space are stored in a first buffer memory of a terminal device and coordinates of the respective vertexes of a two-dimensional polygon representing a picture pattern are stored in a second buffer memory of the terminal device. Then, the terminal device calculates inclinations of the line segments connecting the respective vertexes of the polygon represented in the three-dimensional space and the inclinations of the line segments connecting the respective vertexes of the two-dimensional polygon. Further, it performs interpolation between the respective vertexes of the polygon represented in the three-dimensional space and between the respective vertexes of the two-dimensional polygon and by regarding the interpolated points as start points or end points, interpolation is further performed between the respective associated start points and end points, whereby a picture pattern at the coordinates of the respective points of the two-dimensional polygon is read out. Then, using the coordinates of the respective interpolated points of the polygon in the three-dimensional space as addresses, the picture pattern is written in a frame memory, so that the written picture data is displayed on the CRT display.

Consequently, according to the second aspect of the invention, the host computer does not need to make coordinate transformation in pixel units, as in the first aspect of the invention, and a mapping circuit can be easily structured by a hardware circuit in a terminal device.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
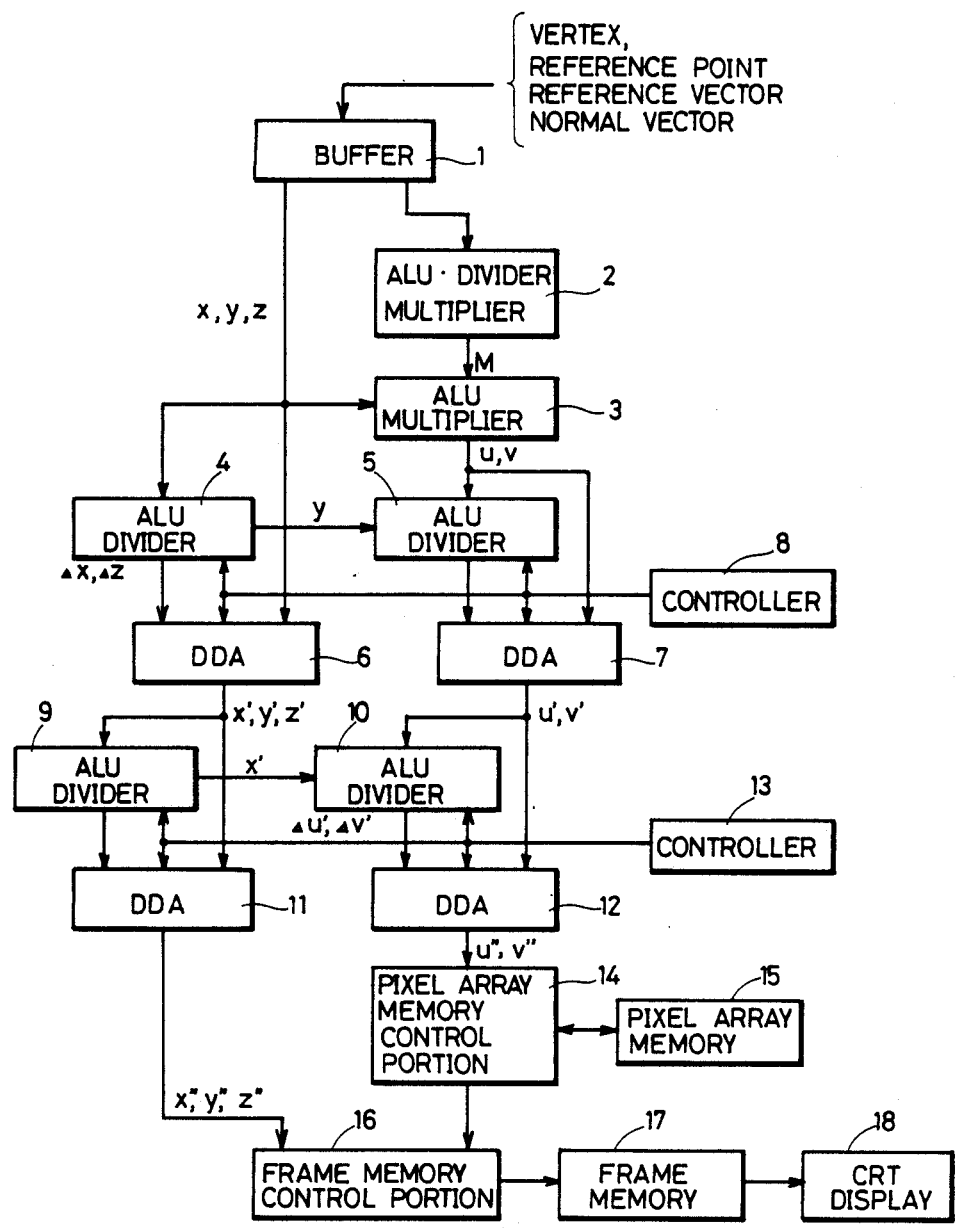
FIG. 1 is a schematic block diagram of an embodiment of the present invention.

FIG. 1 is a schematic block diagram of an embodiment of the present invention. First, referring to FIG. 1, a construction of an embodiment of the present invention will be described. Though not shown, a host computer provides data concerning coordinates of the respective vertexes of a polygon to be represented in a three-dimensional space on a CRT display, reference point coordinates, a reference vector and a normal vector, and it also provides data concerning reference point coordinates and a reference vector of a pixel array as a picture pattern to be mapped on the polygon in the three-dimensional space represented on the CRT display. Those data are supplied to a buffer 1 and stored therein.

The respective vertex coordinates (x, y, z) of the polygon of the three-dimensional graphic stored in the buffer 1 are supplied to an ALU including a multiplier 3, an ALU including a divider 4 and a DDA 6. The reference point coordinates, the reference vector and the normal vector of the polygon of the three-dimensional graphic and the reference point coordinates and the reference vector of the pixel array are supplied to an ALU including a divider-multiplier 2. The ALU including the divider-multiplier 2 calculates a transformation matrix M by which the normal vector of the polygon in the three-dimensional space can be parallel to the depth direction of the three-dimensional space, namely, the axis z and the reference point coordinates and the reference vector on the pixel array can be coincident with the reference point coordinates and the reference vector of the two-dimensional picture pattern, respectively. The transformation matrix M calculated by the ALU including the divider-multiplier 2 is supplied to the ALU including the multiplier 3.

The ALU including the multiplier 3 multiplies the vertex coordinates (x, y, z) of the polygon of the three-dimensional graphic by the transformation matrix M so as to calculate corresponding coordinates (u, v) on the pixel array. On the other hand, the ALU including the divider 4 calculates increments $\Delta x$ and $\Delta z$ of x and z, respectively, with respect to the inclinations of the lines connecting the vertexes, namely, with respect to an increment 1 of y based on the respective vertex coordinates (x, y, z) of the three-dimensional graphic supplied thereto. An ALU including a divider 5 calculates increments $\Delta u$ and $\Delta v$ of u and v, respectively, with respect to an increment 1 of y of the line segments connecting the vertexes on the pixel array, based on the coordinates (u, v) on the pixel array calculated by the ALU including the multiplier 3.

The DDA 6 interpolates coordinates between the respective vertexes of the three-dimensional graphic so as to obtain x', y', z'. A DDA 7 interpolates coordinates between the respective vertexes on the pixel array to obtain u', v'. An ALU including a divider 9 interpolates coordinates between the respective vertexes and by regarding the interpolated points as start points or end points, it calculates an increment $\Delta z'$ of z with respect to an increment 1 of x for the line segments connecting the associated start points and end points. An ALU including a divider 10 calculates inclinations of the line segments connecting the associated start points and end points on the pixel array so as to obtain increments $\Delta u'$ and $\Delta v'$ of u and v respectively, with respect to an increment 1 of x. A DDA 11 calculates coordinates (x'', y'', z'') of the interpolated points between the associated start points and end points on the three-dimensional graphic. A DDA 12 calculates coordinates (u'', v'') of the interpolated points between the associated start points and end points on the pixel array.

A pixel array memory 15 stores in advance the pixel array as the two-dimensional picture pattern. A pixel array memory control portion 14 reads out a corresponding pixel from the pixel array memory 15 by using the interpolated coordinates (u'', v'') obtained by the DDA 12 as addresses and supplies the pixel to a frame memory control portion 16. The frame memory control portion 16 receives the interpolated coordinates (x'', y'', z'') obtained by the DDA 11. Then, the frame memory control portion 16 writes in the frame memory 17 the pixels read out from the pixel array memory 15 by using the interpolated coordinates (x'', y'', z'') as addresses. The pixels written in the frame memory 17 are displayed on the CRT display.

Figure 2A:
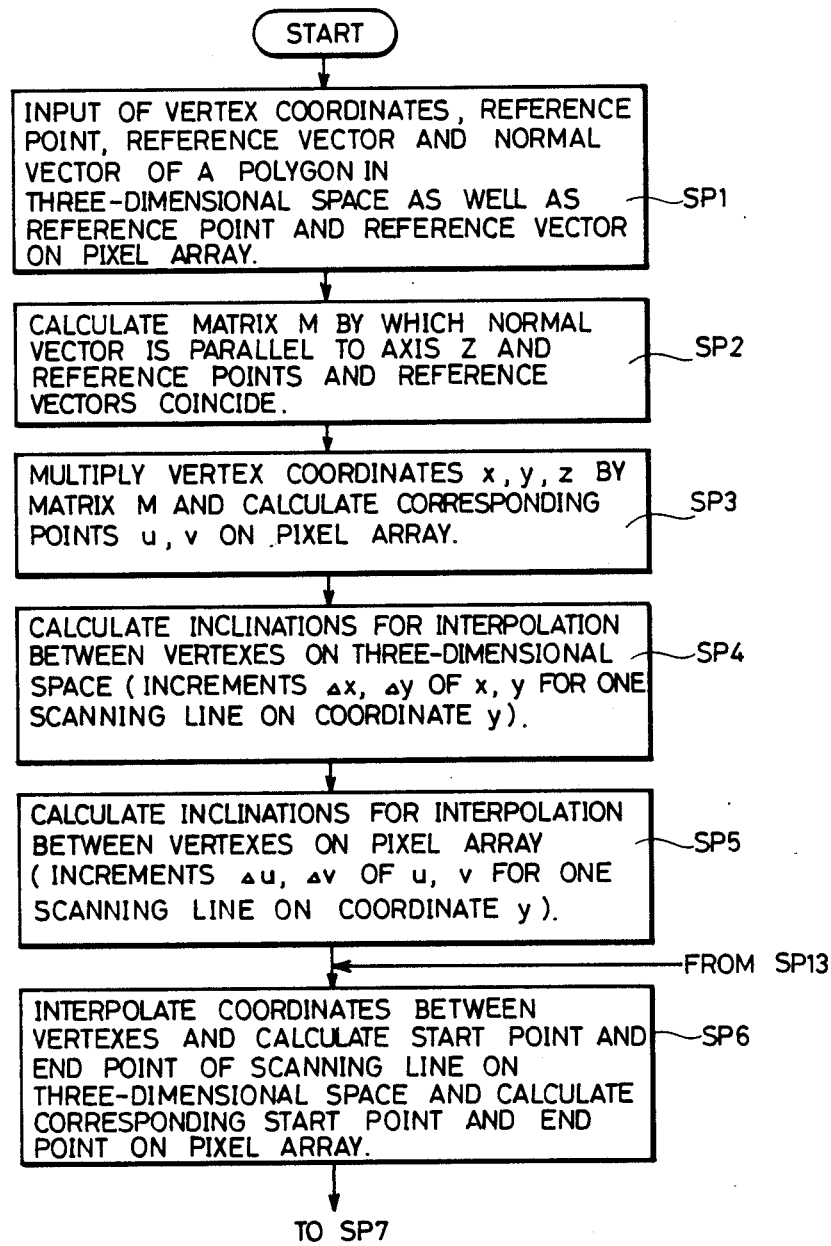
FIGS. 2A and 2B are a flow chart for explaining operation of a first embodiment of the present invention.
Figure 2B:
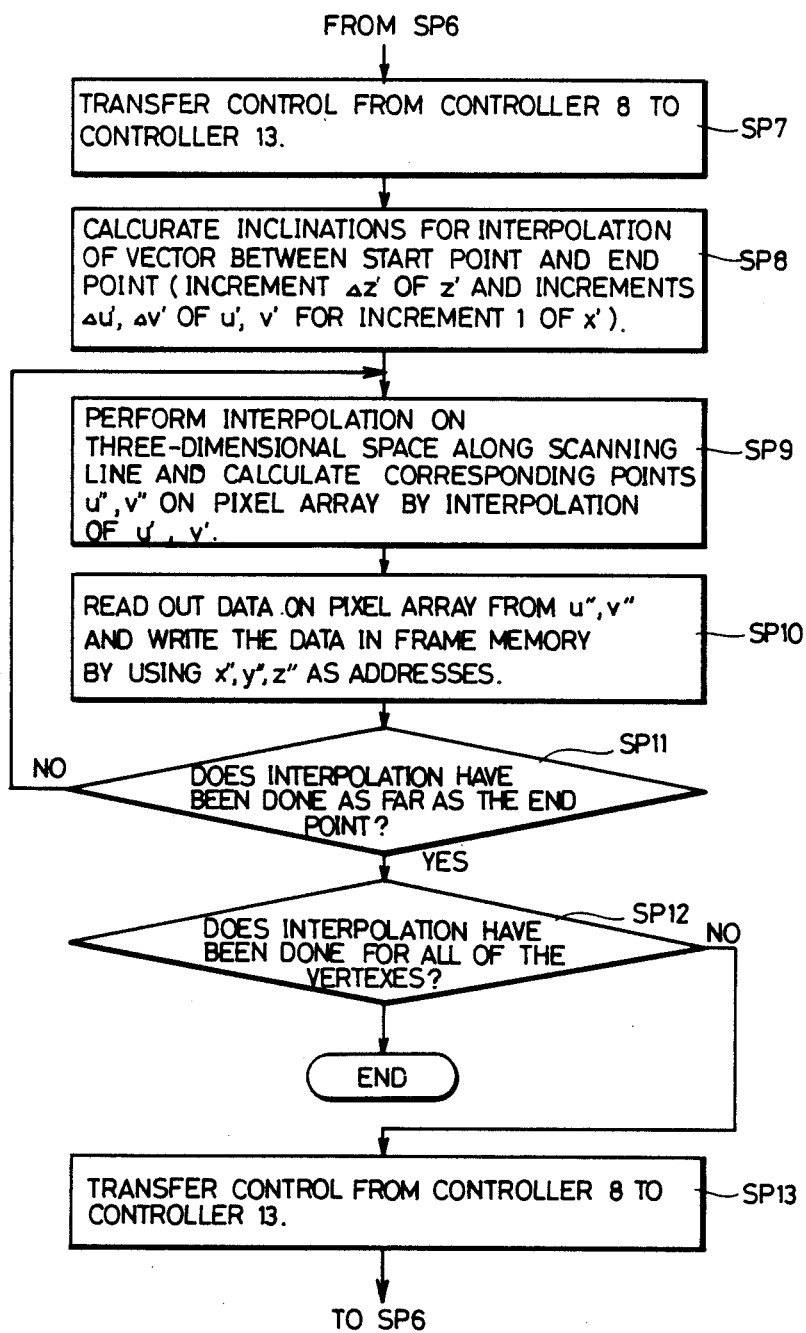

FIG. 2 is a flow chart for explaining the operation of the above stated embodiment of the invention and FIGS. 3 to 6 are diagrams for facilitating understanding of the operation of the above stated embodiment of the invention.

Figure 3:
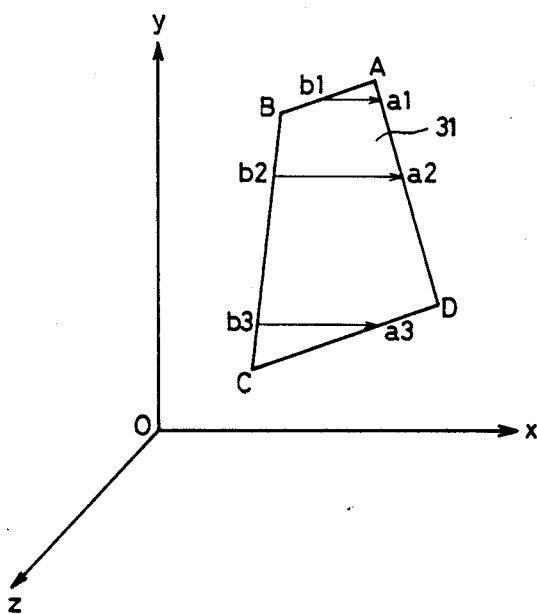
FIGS. 3 to 6 are diagrams for facilitating understanding of the operation of the first embodiment of the present invention.
Figure 4:
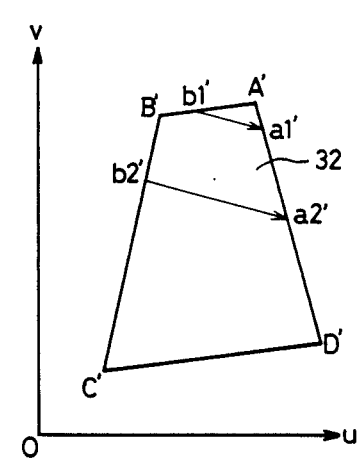

Referring now to FIGS. 1 to 6, the operation of the above stated embodiment of the invention will be more specifically described. First, it is assumed that a picture pattern of a two-dimensional graphic 32 represented by the coordinate axes u and v as shown in FIG. 4 is mapped onto a similar graphic 31 in a three-dimensional space represented by the coordinate axes x, y and z as shown in FIG. 3. It is further assumed that: coordinates of the vertexes of the three-dimensional graphic 31 are A, B, C and D; a reference point of the graphic 31 is C; a reference vector of the graphic 31 is CD; coordinates of the vertexes of the two-dimensional graphic 32 are A', B', C' and D'; a reference point of the graphic 32 is C'; and a reference vector of the graphic 32 is C'D'. Those data on the three-dimensional graphic 31 and the two-dimensional graphic 32 are supplied from the host computer to the buffer 1 at the step SP 1. The buffer 1 stores those data and supplies the coordinates of the vertexes A, B, C and D of the three-dimensional graphic 31 to the ALU including the multiplier 3, the ALU including the divider 4 and the DDA 6. The respective reference points, reference vectors and normal vectors of the three-dimensional graphic 31 and the two-dimensional graphic 32 out of the data stored in the buffer 1 are supplied to the ALU including the divider-multiplier 2.

The ALU including the divider-multiplier 2 calculates the transformation matrix M by which the normal vector of the three-dimensional graphic is parallel to the axis z, the reference point C of the three-dimensional graphic 31 coincides with the reference point C' of the two-dimensional graphic 32, and the reference vector DC of the three-dimensional graphic 31 coincides with the reference vector C'D' of the two-dimensional graphic 32. This transformation matrix M is supplied to the ALU including the multiplier 3. The ALU including the multiplier 3 multiplies the coordinates of the respective vertexes A, B, C and D of the three-dimensional graphic 31 by the transformation matrix M and performs calculation of (u, v)=(x, y, Z)M so that the coordinates of the vertexes A', B', C' and D' of the two-dimensional graphic 32 are calculated.

Figure 5:
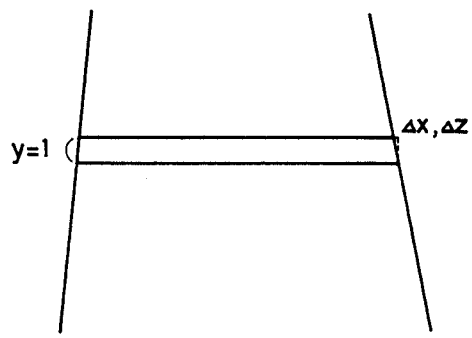
Figure 6:
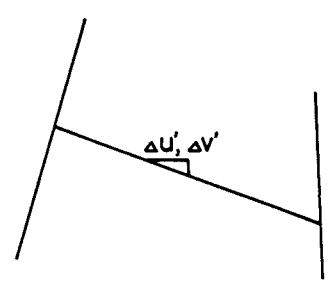

On the other hand, the ALU including the divider 4 calculates inclinations of the line segments connecting the respective vertexes A, B, C and D of the three-dimensional graphic 31. More specifically, as shown in FIG. 5, it calculates increments $\Delta x$, and $\Delta z$ in the directions x and z, respectively, with respect to a scanning line successively given in the direction y, as shown in FIG. 5. In the same manner, the ALU including the divider 5 calculates inclinations of the line segments connecting the respective vertexes A', B', C' and D' of the two-dimensional graphic 32 at the step SP 5. Thus, the ALU including the divider 5 calculates increments $\Delta u$ and $\Delta v$ in the directions u and v, respectively, with respect to a scanning line successively scanned in the direction y.

At the step SP 6, the DDA 6 interpolates coordinates between the respective vertexes A, B, C and D of the three-dimensional graphic 31 based on the inclinations $\Delta x$ and $\Delta z$ calculated by the ALU including the divider 4 and the coordinates of the vertexes A, B, C and D stored in the buffer 1, whereby coordinates of the interpolated points (x', y', z') are calculated. More specifically, the coordinates of the interpolated points (x', y', z') are calculated by the following equations.

$$x' = x + \Delta x$$

$$y' = y + 1$$

$$z' = z + \Delta z$$

The respective interpolated points are used as start points or end points of the scanning lines. For example, an interpolated point b1 between the vertexes A and B is used as a start point and an interpolated point a1 between the vertexes A and D is used as an end point.

On the other hand, the DDA 7 calculates, at the step of SP 6, interpolated points (u', v') on the two-dimensional graphic corresponding to the respective interpolated points on the three-dimensional graphic. More specifically, the interpolated points (u', v') on the two-dimensional graphic are calculated by the following equations.

$$u' = u + \Delta u$$

$$v' = v + \Delta v$$

The points thus obtained are used as a start point b1' and an end point a1' for example on the two-dimensional graphic 32 corresponding to the start point b1 and the end point a1 on the three-dimensional graphic, respectively.

The above stated ALU including the dividers 4 and 5 and the DDA's 6 and 7 are controlled by the controller 8. When the operations at the above stated steps SP 4 to SP 6 are terminated, control is transferred from the controller 8 to the controller 13.

At the step SP 8, the ALU including the divider 9 calculates inclinations to interpolate vectors between the respective associated start points and end points on the three-dimensional graphic 31 calculated at the above stated step SP 6. More specifically, in order to perform interpolation between the start point b2 and the end point a2 of the three-dimensional graphic 31 for example, an increment $\Delta z'$ of z' with respect to an increment 1 of x' is calculated. In addition, the ALU including the divider 10 calculates inclinations for interpolation between the respective associated start points and end points on the two-dimensional graphic 32. More specifically, the ALU including the divider 10 calculates increments $\Delta u'$ and $\Delta v'$ of u and v, respectively, with respect to an increment 1 of x to calculate inclinations between the respective associated start points and end points of the three-dimensional graphic 31. Further, at the step SP 9, the DDA 11 interpolates coordinates between the respective associated start points and end points of the three-dimensional graphic 31 and calculates coordinates of the respective points (x", y", z") by the following equations.

$$x'' = x' + 1$$

$$y'' = y'$$

$$z'' = z + \Delta z'$$

In the same manner, the DDA 12 interpolates points on the two-dimensional graphic 32 corresponding to the respective interpolated points on the three-dimensional graphic 31 and calculates coordinates of the respective points (u", v") by the following equations.

$$u'' = u' + \Delta u'$$

$$v'' = v' + \Delta v'$$

The pixel array memory control portion 14 reads out, at the step SP 10, corresponding picture data from the pixel array memory 15 based on the interpolated points (u", v") of the two-dimensional graphic 32 and supplies the picture data to the frame memory control portion 16. The frame memory control portion 16 writes the picture data read out from the pixel array memory 15 into the frame memory 17 using as addresses the coordinates of the respective points (x", y", z") of the three-dimensional graphic 31 calculated by the DDA 11.

More specifically, by the above described sequential operations, the three-dimensional graphic 31 can be made to correspond to the two-dimensional graphic 32 as the picture pattern and by referring to the picture pattern of the two-dimensional graphic 32 at the respective points on the three-dimensional graphic 31, the picture data can be written in the frame memory 17.

At the step SP 11, it is determined whether interpolation from a start point to an end point of a vector is completed or not. If it is not completed, the operations at the above stated steps SP 9 and SP 10 are repeated. Then, at the step SP 12, it is determined whether all the interpolations between the respective vertexes are completed or not. More specifically, interpolation is performed between vertexes A and B, for example, of the three-dimensional graphic 31 and using the interpolated points as start points and the interpolated points between the vertexes A and D as end points, interpolation is further performed between the start points and the end points and thus the above stated steps SP 6 to SP 11 are repeated so that the interpolations between the respective start points and end points are performed. When the interpolation between the vertexes A and B is completed, interpolation is performed between the vertexes B and C and using the respective interpolated points as start points, the respective interpolated points between the vertexes A and D as end points and the respective interpolated points between the vertexes D and C as end points, interpolation is successively performed between the respective associated start points and end points.

The above described embodiment was related to the case of mapping a polygon of a two-dimensional graphic onto a polygon on a three-dimensional graphic similar to the polygon of the two-dimensional graphic. However, in another embodiment, a polygon of a two-dimensional graphic can be mapped onto a polygon of a three-dimensional graphic not similar to the polygon of the two-dimensional graphic. Such an embodiment will be described in the following.

Figure 7:
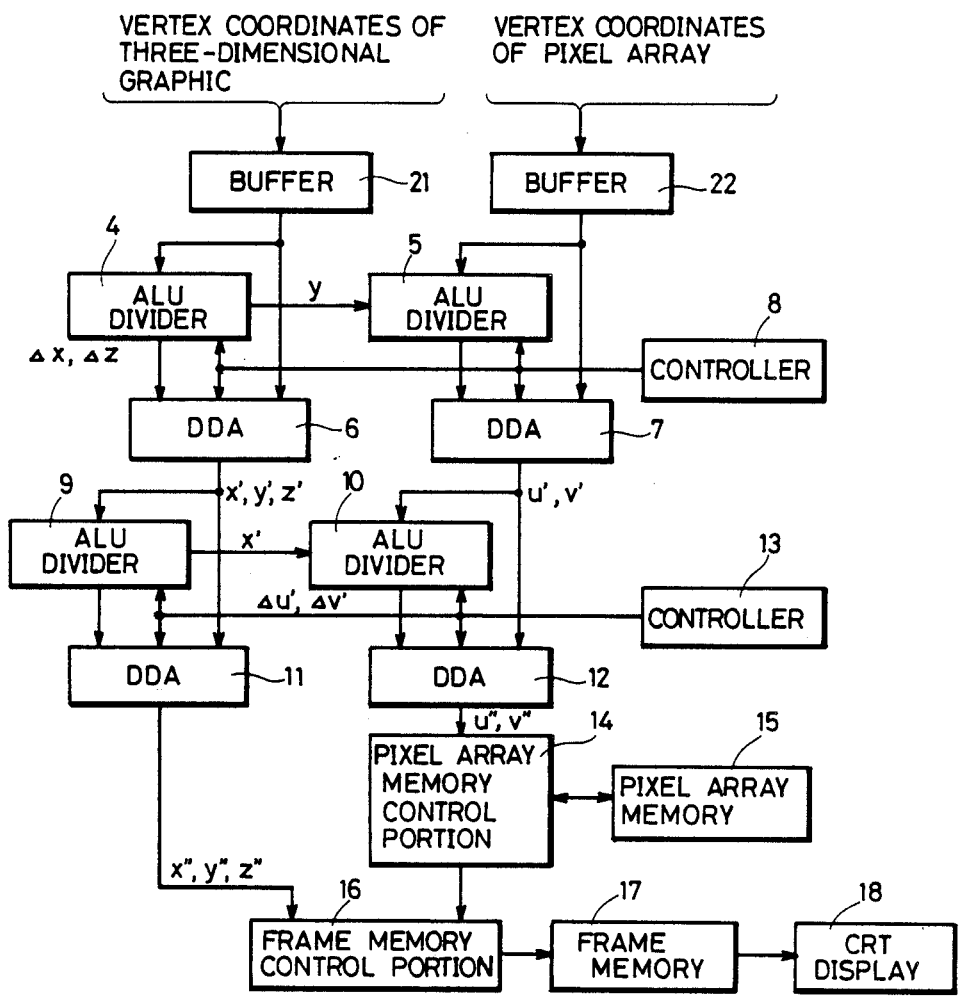
FIG. 7 is a schematic block diagram of a second embodiment of the present invention.

FIG. 7 is a schematic block diagram of another embodiment of the present invention. Referring to FIG. 7, a construction of this embodiment of the invention will be described. A host computer provides coordinates of the respective vertexes of a polygon to be represented in a three-dimensional space on a CRT display and also provides coordinates of the respective vertexes of a two-dimensional polygon representing a picture pattern to be mapped onto the polygon in the three-dimensional space represented on the CRT display. The coordinates of the respective vertexes of the polygon to be represented in the three-dimensional space are supplied to and stored in the buffer memory 21 and the coordinates of the respective vertexes of the two-dimensional polygon are supplied to and stored in the buffer memory 22.

The coordinates of the respective vertexes (x, y, z) of the polygon in the three-dimensional space stored in the buffer memory 21 are supplied to the ALU including the divider 4 and the DDA 6. On the other hand, the coordinates of the respective vertexes of the two-dimensional polygon stored in the buffer memory 22 are supplied to the ALU including the divider 5 and the DDA 7. The components denoted by the numerals 4 to 18, namely, the ALU including the divider 4 through the CRT display 18 are formed in the same manner as described above with reference to FIG. 1.

Figure 8A:
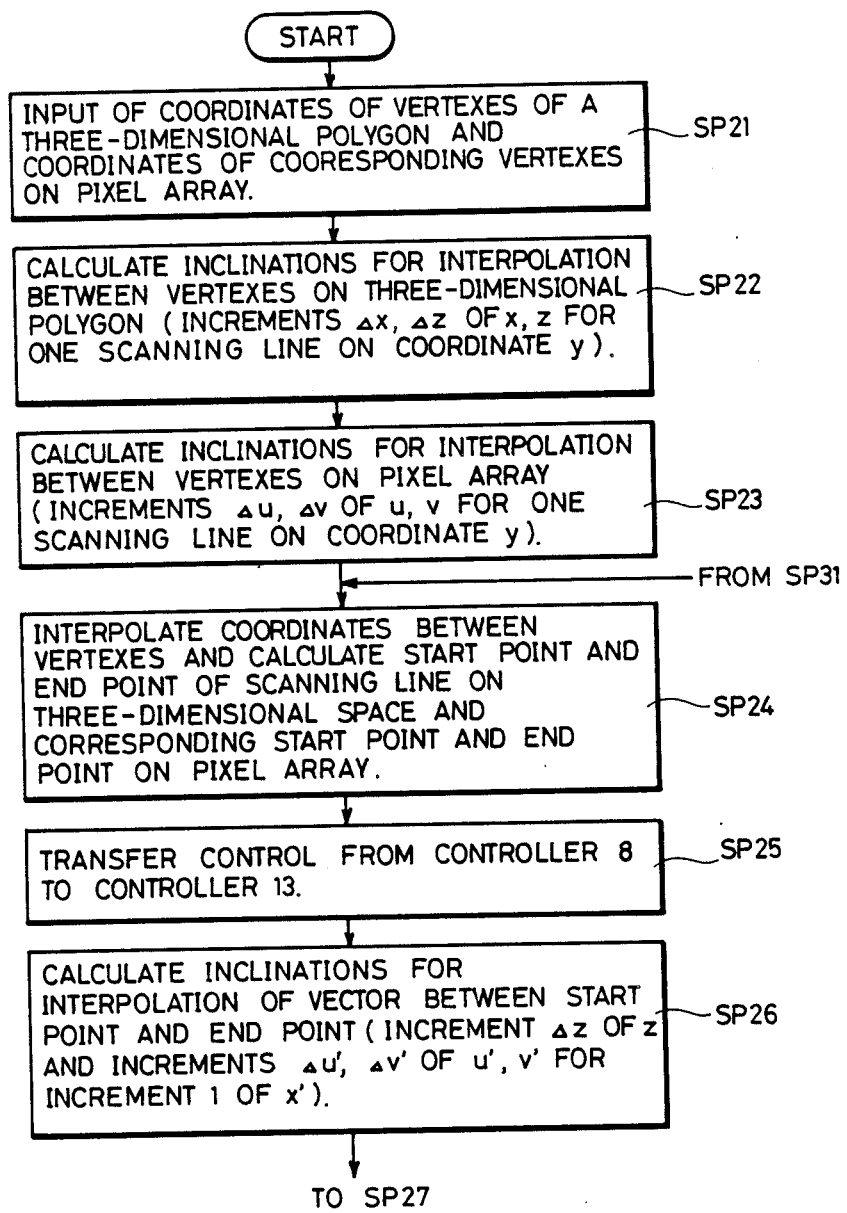
FIGS. 8A and 8B are a flow chart for explaining operation of the second embodiment of the present invention.
Figure 8B:
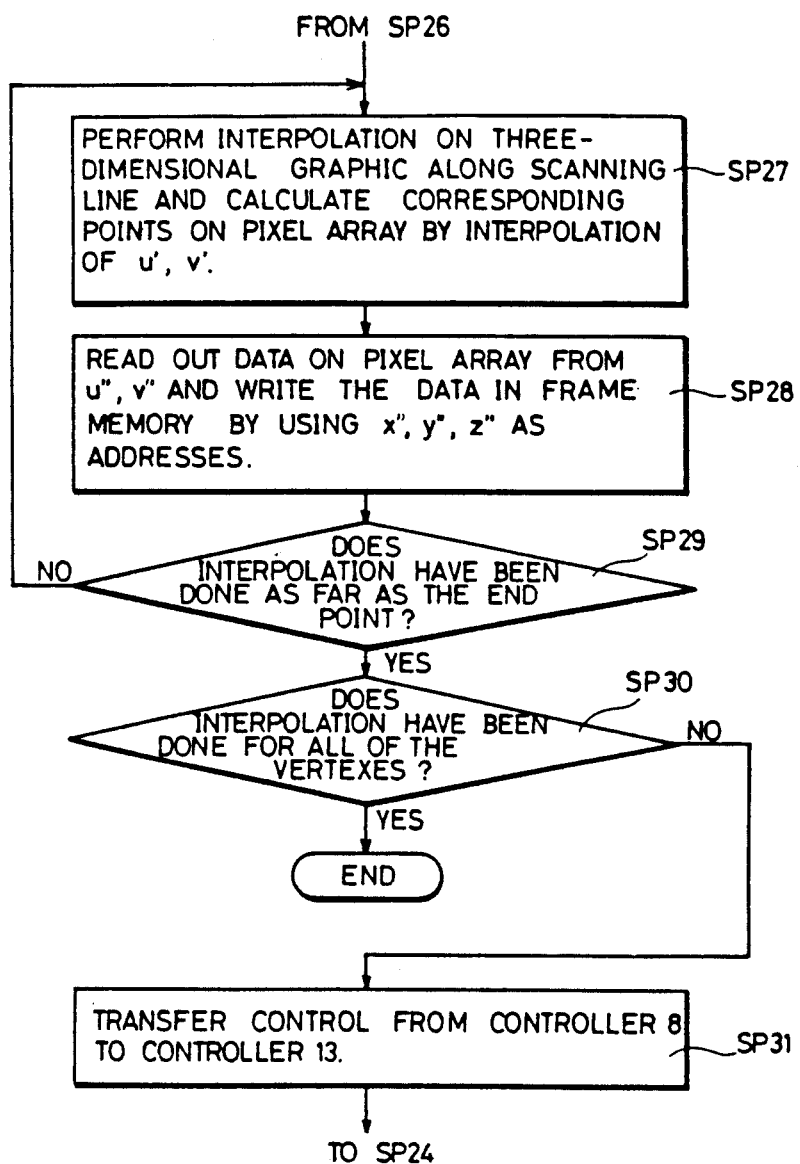

FIGS. 8A and 8B are a flow chart for explaining the operation of the above stated embodiment of the invention and FIGS. 9 to 12 are diagrams for facilitating understanding of the operation of this embodiment.

Figure 9:
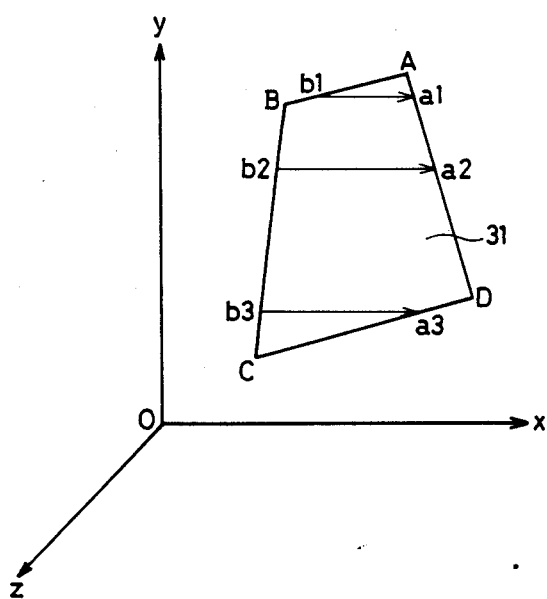
FIGS. 9 to 12 are diagrams for facilitating understanding of the operation of the second embodiment of the present invention.
Figure 10:
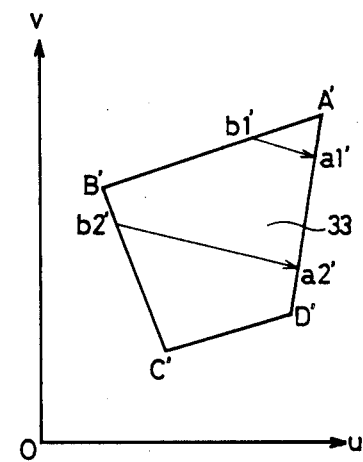

Referring now to FIGS. 7 to 12, the operation of this embodiment of the invention will be specifically described. First, let us assume that the picture pattern of the two-dimensional polygon 33 represented by the coordinate axes u and v as shown in FIG. 10 is to be mapped onto the polygon 31 in the three-dimensional space represented by the coordinate axes x, y and z as shown in FIG. 9. The vertexes of the polygon 31 in the three-dimensional space are A, B, C and D and the vertexes of the two-dimensional polygon 33 are A', B', C' and D'. Coordinates of the respective vertexes of the polygon 31 in the three-dimensional space and the two-dimensional polygon 33 are supplied to the buffer memories 21 and 22 from the host computer not shown at the step SP 21. The buffer memory 21 supplies the coordinates of the vertexes A, B, C and D of the polygon 31 in the three-dimensional space to the ALU including the divider 4 and the DDA 6. The coordinates of the vertexes A', B', C' and D' of the two-dimensional polygon 33 stored in the buffer memory 22 are supplied to the ALU including the divider 5 and the DDA 7.

Figure 11:
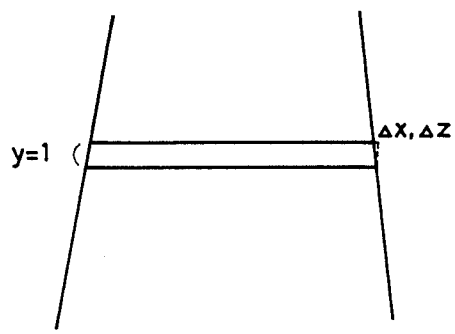
Figure 12:
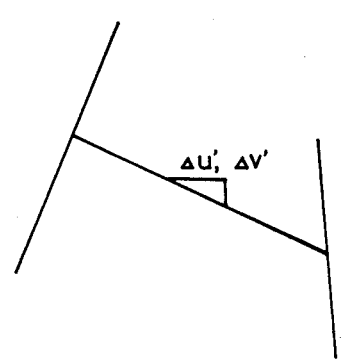

The ALU including the divider 4 calculates inclinations of the line segments connecting the respective vertexes A, B, C and D of the polygon 31 in the three-dimensional space at the step SP 22. More specifically, the ALU including the divider 4 calculates increments $\Delta x$ and $\Delta z$ in the directions x and z, respectively, with respect to a scanning line successively scanned in the direction y, as shown in FIG. 11.

In the same manner, the ALU including the divider 5 calculates inclinations of the line segments connecting the respective vertexes A', B', C' and D' of the two-dimensional polygon 33 at the step SP 23. More specifically, the ALU including the divider 5 calculates increments $\Delta u$ and $\Delta v$ in the directions u and v, respectively, with respect to a scanning line scanned successively in the direction y.

At the step SP 24, the DDA 6 interpolates coordinates between the respective vertexes A, B, C and D of the polygon 31 in the three-dimensional space based on the inclinations $\Delta x$ and $\Delta z$ calculated by the ALU including the divider 4 and the coordinates of the vertexes A, B, C and D stored in the buffer memory 21 so as to calculate coordinates of the interpolated points (x', y', z'). More specifically, the coordinates of the interpolated points (x', y', z') are calculated by the following equations.

$$x' = x + \Delta x$$

$$y' = y + 1$$

$$z' = z + \Delta z$$

Then, the interpolated points are used as start points or end points of the scanning lines. For example, the interpolated point b1 between the vertexes A and B is used as a start point and the interpolated point a1 between the vertexes A and D is used as an end point.

In the same manner, the DDA 7 calculates interpolated points (u', v') on the two-dimensional polygon 33 corresponding to the interpolated points on the polygon 31 in the three-dimensional space. More specifically, the interpolated points (u', v') on the two-dimensional polygon 33 are calculated by the following equations.

$$u' = u + \Delta u$$

$$v' = v + \Delta v$$

Then, the interpolated points are used as a start point b1' and an end point a1' on the two-dimensional polygon 33 corresponding to the start point b1 and the end point a1, respectively, on the polygon 31 in the three-dimensional space.

The above stated ALU including the dividers 4 and 5 and DDA's 6 and 7 are controlled by the controller 8. When the operations at the above stated steps SP 22 to SP 24 are completed, control is transferred from the controller 8 to the controller 13 at the step SP 25.

At the step SP 26, the ALU including the divider 9 calculates inclinations to interpolate vectors between the respective start points and the respective end points on the polygon 31 in the three-dimensional space calculated at the above stated step SP 24. More specifically, the ALU including the divider 9 calculates an increment $\Delta z'$ of z' with respect to an increment 1 of x' so as to perform interpolation between the start point b2 and the end point a2, for example, of the polygon 31 in the three-dimensional space. In addition, the ALU including the divider 10 calculates inclinations to perform interpolation between the respective start points and end points on the two-dimensional polygon 33. More specifically, it calculates increments $\Delta u'$ and $\Delta v'$ of u and v, respectively, with respect to an increment 1 of x' to calculate inclinations between the respective start points and end points of the polygon 31 in the three-dimensional space.

Further, at the step SP 27, the DDA 11 interpolates coordinates between the respective start points and end points of the polygon 31 in the three-dimensional space and calculates coordinates (x'', y'', z'') of the interpolated points by the following equations.

$$x'' = x' + 1$$

$$y'' = y'$$

$$z'' = z' + \Delta z'$$

In the same manner, the DDA 12 interpolates points on the two-dimensional polygon 33 corresponding to the interpolated points of the polygon 31 in the three-dimensional space and calculates coordinates (u", v") of the respective points by the following equations.

$$u'' = u' + \Delta u'$$

$$v'' = v' + \Delta v'$$

The pixel array memory control portion 14 reads out, at the step SP 28, corresponding picture data from the pixel array memory 15 based on the interpolated points (u", v") on the two-dimensional polygon 33 and supplies the picture data to the frame memory control portion 16. The frame memory control portion 16 writes the picture data read out from the pixel array memory 15 in the frame memory 17 by using as addresses the coordinates (x", y", z") of the respective points of the polygon 31 in the three-dimensional space calculated by the DDA 11.

More specifically, by the above described sequential operations, the polygon 31 in the three-dimensional space can be made to correspond to the two-dimensional polygon 33 as the picture pattern and by referring to the picture pattern of the two-dimensional polygon 33 at the respective points on the polygon 31 in the three-dimensional space, the picture data can be written in the frame memory 17.

At the step SP 29, it is determined whether interpolation from a start point to an end point of a vector is completed or not. If it is not completed, the operations at the above stated steps SP 27 and SP 28 are repeated. Then, at the step SP 30, it is determined whether all the interpolations between the respective vertexes are completed or not. More specifically, interpolation is performed for example between the vertexes A and B of the polygon 31 in the three-dimensional space and by using the interpolated points as start points and the points interpolated between the vertexes A and D as end points, interpolations are performed between the respective start points and end points and thus the operations at the above stated steps of SP 24 to SP 29 are repeated. When the interpolation between the vertexes A and B is completed, interpolation is now performed between the vertexes B and C and using the interpolated points as start points and the points interpolated between the vertexes A and D as end points as well as the points interpolated between the vertexes D and C as end points, interpolations between the respective start points and end points are successively performed.

As described above, according to this embodiment, the coordinates of the vertexes of the polygon 31 in the three-dimensional space and coordinates of the vertexes of the two-dimensional polygon 33 as the picture pattern are stored in the buffer memories 21 and 22, respectively, and the coordinates of the vertexes of the polygon 31 and those of the polygon 33 are made to correspond. Consequently, even if the polygon 31 and the polygon 33 are not equal or similar to each other, the picture pattern of the polygon 33 can be mapped onto the polygon 31.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A CRT display device, used to display a representation of a three-dimensional polygon defined by data received from a host computer, said CRT display device comprising:

picture pattern storing means for storing a picture pattern and reference information for a two-dimensional polygon in a plane defined by an axis u and an axis v, a CRT display for displaying a two-dimensional representation of the three-dimensional polygon having vertexes with three-dimensional coordinates in a three-dimensional space defined by an axis x, an axis y and an axis z, vertex calculating means for calculating two dimensional coordinates of vertexes of said two-dimensional polygon from the data defining said three-dimensional polygon and the reference information for the two-dimensional polygon, inclination calculating means for calculating inclinations of line segments connecting adjacent vertexes of said three-dimensional polygon and inclinations of line segments connecting adjacent vertexes of said two-dimensional polygon, including:

first increment calculating means for calculating increments parallel to the axis x and the axis z on the line segments connecting the adjacent vertexes of said three-dimensional polygon in response to increments parallel to the axis y, and second increment calculating means for calculating increments parallel to the axis u and the axis v on the line segments connecting the adjacent vertexes of said two-dimensional polygon, corresponding to the increments calculated by said first increment calculating means, vertexes interpolating means for performing interpolation between the adjacent vertexes of said three-dimensional polygon based on the three-dimensional coordinates of the vertexes of said three-dimensional polygon and the inclinations of the line segments therebetween, to produce first interpolated points, and for performing interpolation between the adjacent vertexes of said two-dimensional polygon based on the two-dimensional coordinates of the vertexes of said two-dimensional polygon and the inclinations of the line segments therebetween, to produce second interpolated points, start and end points interpolating means for performing interpolation between pairs of the first interpolated points on said three-dimensional polygon to produce third interpolated points and for performing interpolation between corresponding pairs of the second interpolated points on said two-dimensional polygon to produce fourth interpolated points, the first, second, third and fourth interpolated points having coordinates, reading means for reading, from said picture pattern storing means, the picture pattern at the coordinates of the fourth interpolated points within said two-dimensional polygon, and a frame memory, operatively connected to said reading means, said start and end points interpolating means and said CRT display, including storage areas corresponding to display areas of said CRT display for storing the picture pattern read out by said reading means using as addresses the coordinates of the third interpolated points.

2. A CRT display device in accordance with claim 1, wherein the reference data for said two-dimensional polygon and the data defining said three-dimensional polygon each include a reference point and a reference vector, and wherein said vertex calculating means comprises:

matrix calculating means for calculating a transformation matrix for transforming the three-dimensional coordinates of said three-dimensional polygon into transformed coordinates where a normal vector of a planar surface bounded by said three-dimensional polygon is parallel to the axis z in the three-dimensional space, the reference point of said three-dimensional polygon coincides with the reference point of said two-dimensional polygon and the reference vector of said three-dimensional polygon coincides with the reference vector of said two-dimensional polygon, and coordinate calculating means for multiplying the three-dimensional coordinates of each vertex of said three-dimensional polygon by the transformation matrix calculated by said matrix calculating means to calculate the two-dimensional coordinates of the vertexes of said two-dimensional polygon.

3. A CRT display device in accordance with claim 1, wherein said vertexes interpolating means comprises:

first edge interpolating means for performing interpolation between the adjacent vertexes of said three-dimensional polygon based on the increments parallel to the axis x and the axis z calculated by said first increment calculating means and the three-dimensional coordinates of the vertexes of said three-dimensional polygon to produce the first interpolated points, and second edge interpolating means for calculating the second interpolated points on said two-dimensional polygon corresponding to the first interpolated points between the vertexes of said three-dimensional polygon produced by said first edge interpolating means.

4. A CRT display device used to display a representation of a three-dimensional polygon defined by data received from a host computer, said CRT display device comprising:

picture pattern storing means for storing a picture pattern and reference information for a two-dimensional polygon in a plane defined by an axis u and an axis v, a CRT display for displaying a three-dimensional polygon having vertexes with three-dimensional coordinates in a three-dimensional space defined by an axis x, an axis y and an axis z, vertex calculating means for calculating a correspondence between the two-dimensional coordinates of vertexes of said two-dimensional polygon from the data defining said three-dimensional polygon and the reference information for the two-dimensional polygon, inclination calculating means for calculating inclinations of line segments connecting adjacent vertexes of said three-dimensional polygon and inclinations of line segments connecting adjacent vertexes of said two-dimensional polygon, vertexes interpolating means for performing interpolation between the adjacent vertexes of said three-dimensional polygon based on the three-dimensional coordinates of the vertexes of said three-dimensional polygon and the inclinations of the line segments therebetween, to produce first interpolated points, and for performing interpolation between the adjacent vertexes of said two-dimensional polygon based on the two-dimensional coordinates of the vertexes of said two-dimensional polygon and the inclinations of the line segments therebetween, to produce second interpolated points, start and end points interpolating means for performing interpolation between pairs of the first interpolated points on said three-dimensional polygon to produce third interpolated points and for performing interpolation between corresponding pairs of the second interpolated points on said two-dimensional polygon to produce fourth interpolated points, the first, second, third and fourth interpolated points having coordinates, said start and end points interpolating means including first inclination calculating means for calculating an inclination of a first vector formed by using as start and end points one of the pairs of the first interpolated points on the three-dimensional polygon produced by said vertexes interpolating means, second inclination calculating means for calculating an inclination of a second vector formed by using as start and end points one of the pairs of the second interpolated points on the two-dimensional polygon produced by said vertexes interpolating means, first vector interpolating means for performing interpolation between the start and end points of the first vector used in said first inclination calculating means, based on the coordinates of the start and end points of the first vector and the inclinations calculated by said first inclination calculating means, and second vector interpolating means for performing interpolation between the start and end points of the second vector used in said second inclination calculating means, based on the coordinates of the start and end points of the second vector and the inclinations calculated by said second inclination calculating means, reading means for reading, from said picture pattern storing means, the picture pattern at the coordinates of the fourth interpolated points within said two-dimensional polygon, and a frame memory, operatively connected to said reading means, said start and end points interpolating means and said CRT display, including storage areas corresponding to display areas of said CRT display for storing the picture pattern read out by said reading means using as addresses the coordinates of the third interpolated points.

5. A CRT display device used to display a representation of a three-dimensional polygon defined by data received from a host computer, said CRT display device comprising:

picture pattern storing means for storing a picture pattern for a two-dimensional polygon having vertexes with coordinates in a plan e defined by an axis u and an axis v, a CRT display for displaying a two-dimensional representation of said three-dimensional polygon having vertexes with coordinates in a three-dimensional space defined by an axis x, an axis y and an axis z, first storing means for storing the coordinates of the vertexes of said three-dimensional polygon, second storing means for storing the coordinates of the vertexes of said two-dimensional polygon, inclination calculating means for calculating inclinations of line segments connecting adjacent vertexes of said three-dimensional polygon based on the coordinates of the vertexes stored in said first storing means and for calculating inclinations of line segments connecting adjacent vertexes of said two-dimensional polygon based on the coordinates of the vertexes stored in said second storing means, said inclination calculating means including first increment calculating means for calculating increments parallel to the axis x and the axis z on the line segments connecting the adjacent vertexes of said three-dimensional polygon in response to increments parallel to the axis y, and second increment calculating means for calculating increments parallel to the axis u and the axis v on the line segments connecting the adjacent vertexes of said two-dimensional polygon, corresponding to the increments calculated by said first increment calculating means, vertexes interpolating means for performing interpolation between the adjacent vertexes of said three-dimensional polygon based on the coordinates of the vertexes of said three-dimensional polygon and the inclinations of the line segments therebetween, to produce first interpolated points and for performing interpolation between the adjacent vertexes of said two-dimensional polygon based on the coordinates of the vertexes of said two-dimensional polygon stored in said second storing means and the inclinations of the line segments therebetween, to produce second interpolated points, start and end points interpolating means for performing interpolation between pairs of the first interpolated points on said three-dimensional polygon to produce third interpolated points and for performing interpolation between pairs of the second interpolated points on said two-dimensional polygon to produce fourth interpolated points, the first, second, third and fourth interpolated points having coordinates, reading means for reading, from said picture pattern storing means, the picture pattern at the coordinates of each of the fourth interpolated points within said two-dimensional polygon, and a frame memory, operatively connected to said reading means, said start and end points interpolating means and said CRT display, including storage areas corresponding to display areas of said CRT display for storing the picture pattern read out by said reading means using as addresses the coordinates of the third interpolated points.

6. A CRT display device in accordance with claim 5, wherein said vertexes interpolating means comprises:

first edge interpolating means for performing interpolation between the adjacent vertexes of said three-dimensional polygon based on the increments parallel to the axis x and the axis z calculated by said first increment calculating means and the coordinates of the vertexes of said three-dimensional polygon to produce the first interpolated points, and second edge interpolating means for calculating the second interpolated points on the two-dimensional polygon corresponding to the first interpolated points between the respective vertexes of the three-dimensional polygon produced by said first edge interpolating means.

7. A CRT display device used to display a representation of a three-dimensional polygon defined by data received from a host computer, said CRT display device comprising:

picture pattern storing means for storing a picture pattern for a two-dimensional polygon having vertexes with coordinates in a plane defined by an axis u and an axis v, a CRT display for displaying a two-dimensional representation of said three-dimensional polygon having vertexes with coordinates in a three-dimensional space defined by an axis x, an axis y and an axis z, first storing means for storing the coordinates of the vertexes of said three-dimensional polygon, second storing means for storing the coordinates of the vertexes of said two-dimensional polygon, inclination calculating means for calculating inclinations of line segments connecting adjacent vertexes of said three-dimensional polygon based on the coordinates of the vertexes stored in said first storing means and for calculating inclinations of line segments connecting adjacent vertexes of said two-dimensional polygon based on the coordinates of the vertexes stored in said second storing means, vertexes interpolating means for performing interpolation between the adjacent vertexes of said three-dimensional polygon based on the coordinates of the vertexes of said three-dimensional polygon and the inclinations of the line segments therebetween, to produce first interpolated points and for performing interpolation between the adjacent vertexes of said two-dimensional polygon based on the coordinates of the vertexes of said two-dimensional polygon stored in said second storing means and the inclinations of the line segments therebetween, to produce second interpolated points, start and end points interpolating means for performing interpolation between pairs of the first interpolated points on said three-dimensional polygon to produce third interpolated points and for performing interpolation between pairs of the second interpolated points on said two-dimensional polygon to produce fourth interpolated points, the first, second, third and fourth interpolated points having coordinates, said start and end points interpolating means including first inclination calculating means for calculating an inclination of a first vector formed by using as start and end points one of the pairs of the first interpolated points on the three-dimensional polygon produced by said vertexes interpolating means, second inclination calculating means for calculating an inclination of a second vector formed by using as start and end points one of the pairs of the second interpolated points on the two-dimensional polygon produced by said vertexes interpolating means, first vector interpolating means for performing interpolation between the start and end points of the first vector used in said first inclination calculating means, based on the start and end points of the first vector and the inclinations calculated by said first inclination calculating means, and second vector interpolating means for performing interpolation between the start and end points of the second vector used in said second inclination calculating means, based on the coordinates of the start and end points of the second vector and the inclinations calculated by said second inclinations calculating means, reading means for reading, from said picture pattern storing means, the picture pattern at the coordinates of each of the fourth interpolated points within said two-dimensional polygon, and a frame memory, operatively connected to said reading means, said start and end points interpolating means and said CRT display, including storage areas corresponding to display areas of said CRT display for storing the picture pattern read out by said reading means using as addresses the coordinates of the third interpolated points.

8. A mapping method used to display a representation of a three-dimensional polygon, defined by data from a host computer, on a CRT display device, comprising the steps of:

(a) storing a predetermined picture pattern for a two-dimensional polygon having vertexes with coordinates in a plan e defined by an axis u and an axis v, (b) calculating a correspondence between the vertexes of said two-dimensional polygon and the vertexes of the three-dimensional polygon having vertexes with coordinates in a three-dimensional space defined by an axis x, and axis y and an axis z, (c) calculating inclinations of line segments connecting adjacent vertexes of said three-dimensional polygon and inclinations of line segments connecting adjacent vertexes of said two-dimensional polygon in dependence upon the correspondence calculated in step (b), by calculating increments parallel to the axis x and the axis z on the line segments connecting the adjacent vertexes of said three-dimensional polygon in response to increments parallel to the axis v and calculating increments parallel to the axis u and the axis v on the line segments connecting the adjacent vertexes of said two-dimensional polygon, corresponding to the increments calculated by said first increment calculating means, (d) performing interpolation between the adjacent vertexes of said three-dimensional polygon, based on the coordinates of the vertexes of said three-dimensional polygon and the inclinations of the line segments therebetween to produce first interpolated points, (e) performing interpolation between the adjacent vertexes of said two-dimensional polygon, based on the coordinates of the vertexes of said two-dimensional polygon and the inclinations of the line segments connecting the adjacent vertexes of said two-dimensional polygon to produce second interpolated points, (f) performing interpolation between pairs of the first interpolated points on said three-dimensional polygon to produce third interpolated points, (g) performing interpolation between pairs of the second interpolated points on said two-dimensional polygon, corresponding to the pairs of the first interpolated points, to produce fourth interpolated points, the first, second, third and fourth interpolated points having coordinates, (h) providing a display picture pattern at the coordinates of the fourth interpolated points within said two-dimensional polygon, and (i) storing the display picture pattern using as addresses the coordinates of the third interpolated points.

9. A mapping method used to display a representation of a three-dimensional polygon, defined by data from a host computer, on a CRT device, comprising the steps of:

(a) storing a predetermined picture pattern for a two-dimensional polygon having vertexes with coordinates in a plane defined by an axis u and an axis v, (b) storing coordinates of vertexes of a three-dimensional polygon having vertexes with coordinates of the three-dimensional space defined by an axis x, and axis y and axis z, (c) storing the coordinates of the vertexes of said two-dimensional polygon, (d) calculating inclinations of line segments connecting adjacent vertexes of said three-dimensional polygon, based on the coordinates of the vertexes of said three-dimensional polygon stored in step (b), by calculating increments parallel to the axis x and the axis z on the line segments connecting the adjacent vertexes of aid three-dimensional polygon in response to increments parallel to the axis y, (e) calculating inclinations of line segments connecting adjacent vertexes of said two-dimensional polygon, based on the coordinates of the vertexes of said two-dimensional polygon stored in step (c), by calculating increments parallel to the axis u and the axis y on the line segments connecting the adjacent vertexes of said two-dimensional polygon, corresponding to the increments calculated by said first increment calculating means, (f) performing interpolation between the adjacent vertexes of said three-dimensional polygon, based on the coordinates of the vertexes of said three-dimensional polygon and the inclinations of the line segments connecting the adjacent vertexes of said three-dimensional polygon to produce first interpolated points, (g) performing interpolation between the adjacent vertexes of said two-dimensional polygon, based on the coordinates of the vertexes of said two-dimensional polygon and the inclinations of the line segments connecting the adjacent vertexes of said two-dimensional polygon to produce second interpolated points, (h) performing interpolation between pairs of the first interpolated points on said three-dimensional polygon to produce third interpolated points, (i) performing interpolation between pairs of the second interpolated points on said two-dimensional polygon, corresponding to the pairs of the first interpolated points to produce fourth interpolated points, the first, second third and fourth interpolated points having coordinates, (j) providing a display picture pattern at the coordinates of the fourth interpolated points, within said two-dimensional polygon, and (k) storing the display picture pattern using as addresses the coordinates of the third interpolated points.

* * * * *

UNITED STATES PATENT AND TRADEMARK OFFICE
CERTIFICATE OF CORRECTION

PATENT NO. : 4,974,177

DATED : November 27, 1990

INVENTOR(S) : Nishiguchi

It is certified that error appears in the above-identified patent and that said Letters Patent is hereby corrected as shown below:

Col. 12, line 66, "plan e" should be --plane--.

Col. 13, line 68, after "the" (1st occurrence) insert --three-dimensional--.

Col. 14, line 6, delete "respective".

Signed and Sealed this

Second Day of June, 1992

Attest:

DOUGLAS B. COMER

*Attesting Officer*      *Acting Commissioner of Patents and Trademarks*